UNITED STATES PATENT OFFICE.

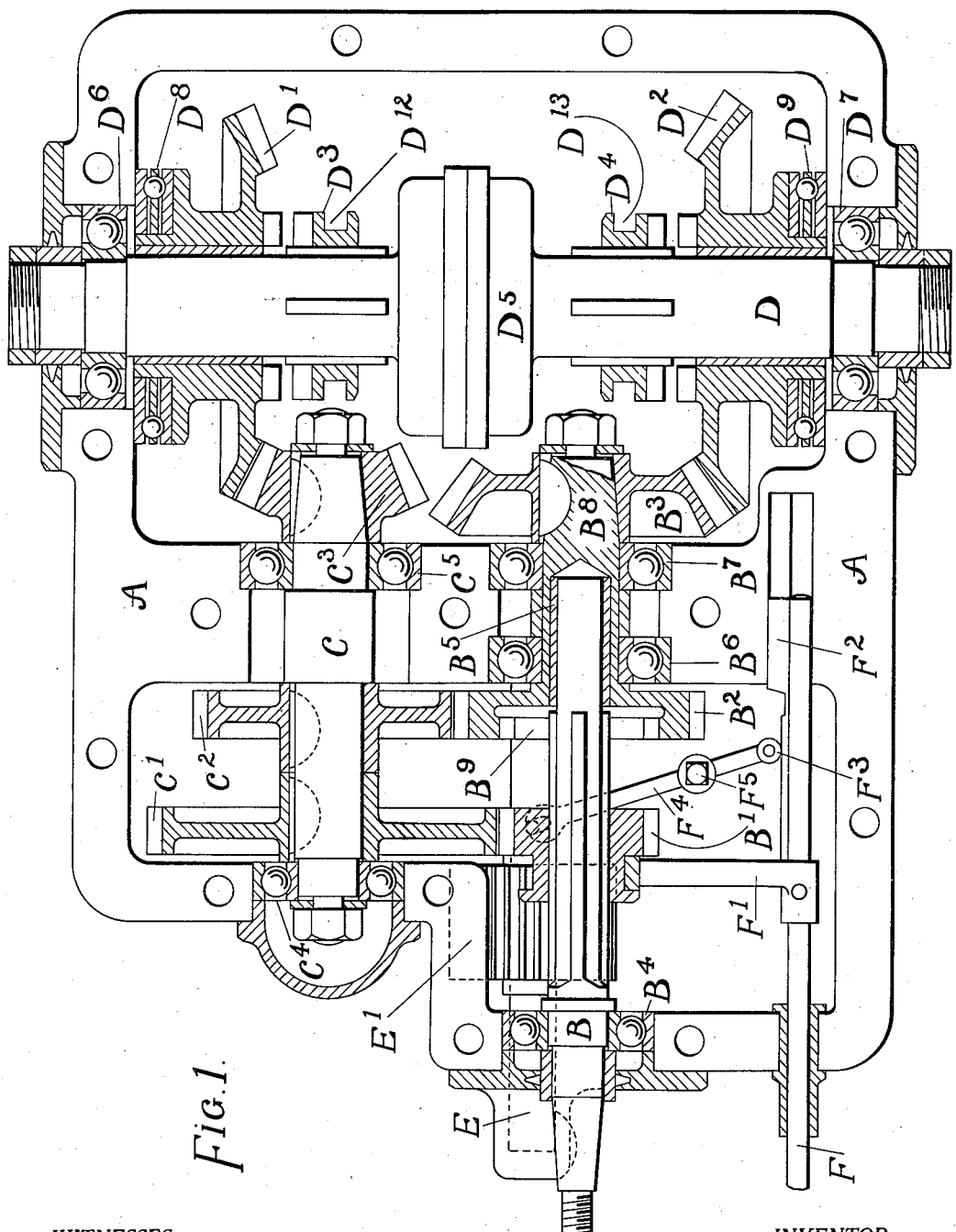

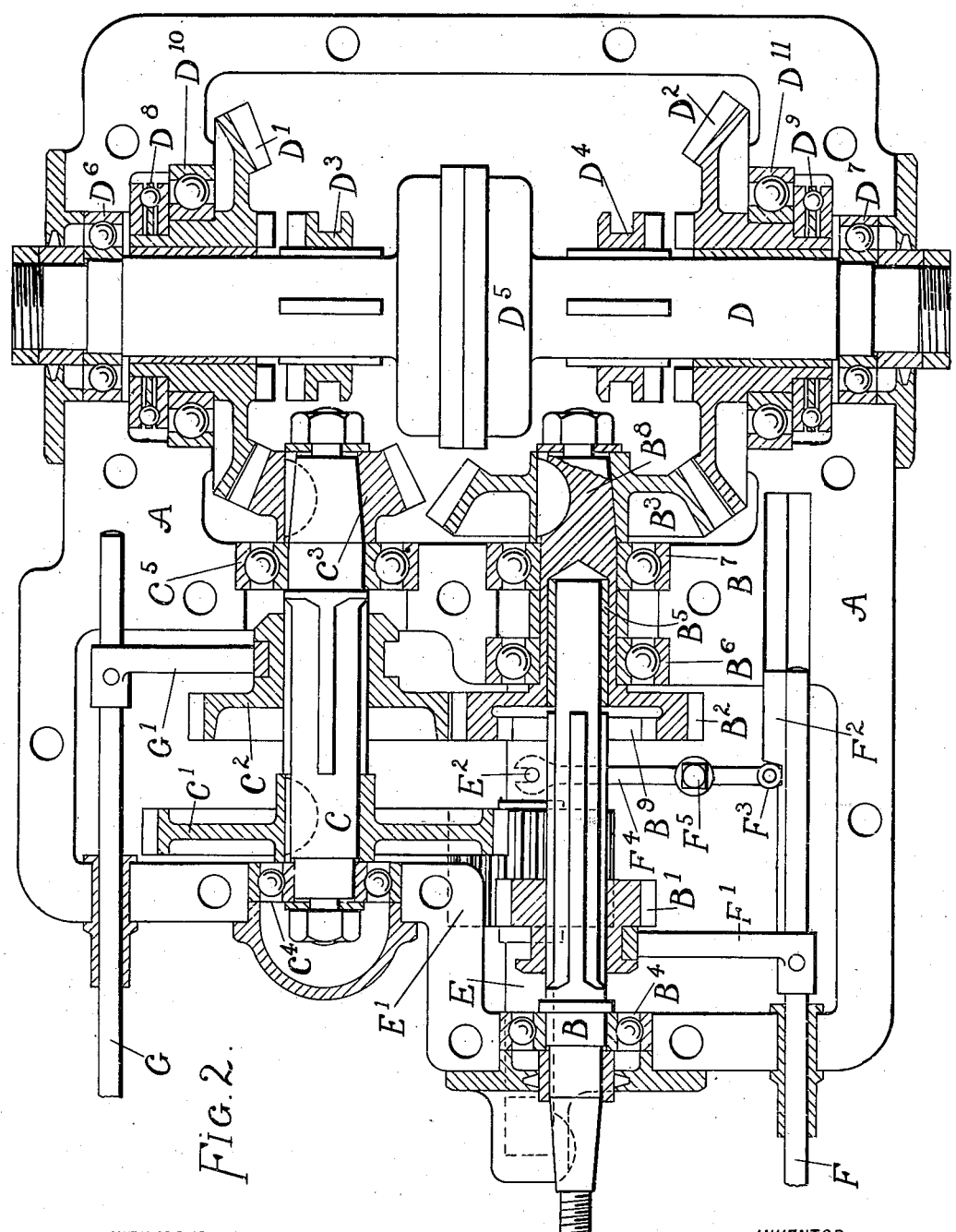

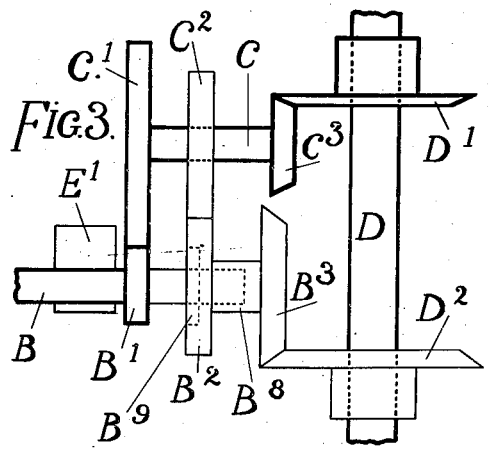
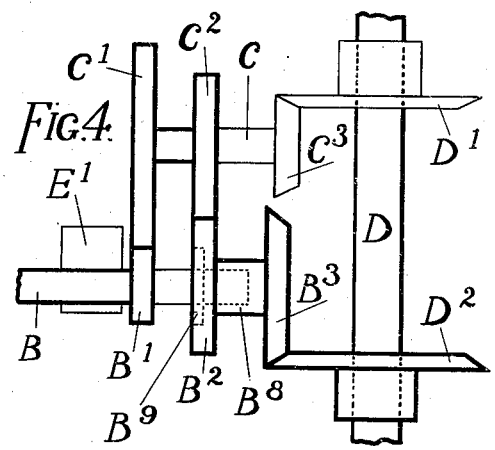
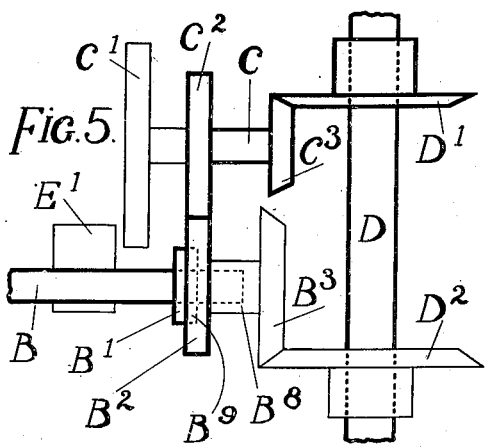
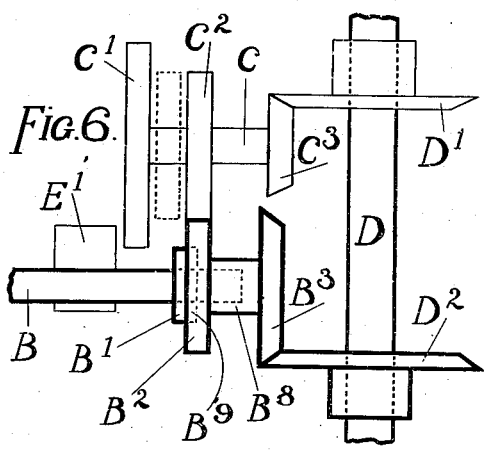
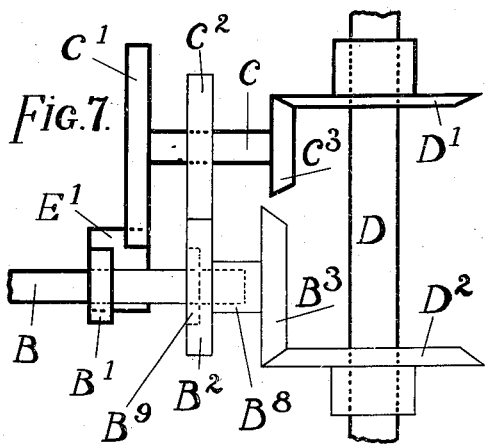
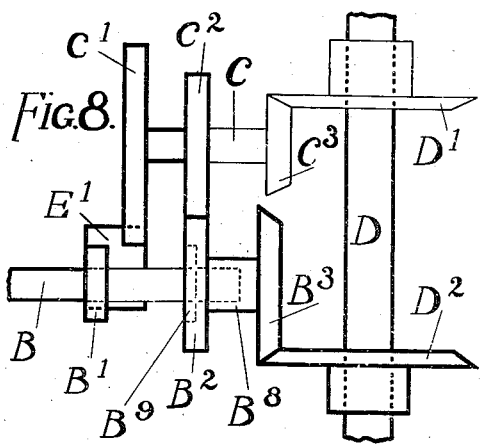

AUSTIN M. WOLF, OF NEW YORK, N. Y.

CHANGE-SPEED GEARING.

933,870.     Specification of Letters Patent.     Patented Sept. 14, 1909.

Application filed November 13, 1908. Serial No. 462,414.

*To all whom it may concern:*

Be it known that I, AUSTIN M. WOLF, a citizen of the United States, residing at New York, in the borough of Manhattan, county and State of New York, have invented certain new and useful Improvements in Change-Speed Gearing, of which the following is a specification.

My invention relates to speed changing and reversing mechanisms, being especially adapted for use in motor vehicles, although it may be employed in any mechanism to be driven at variable speeds.

The object of this invention is to provide a novel and effective change gearing, whereby a simpler, more efficient, and less costly mechanism is obtained than that in use at the present time.

These and other features of my invention will be more fully set forth with reference to the accompanying drawings forming a part of this specification, in which:—

Figure 1 is a horizontal section of my improved system of gearing; Fig. 2 is a horizontal section of the same parts in a different position; and Figs. 3, 4, 5, 6, 7 and 8 are diagrammatic views showing the positions of the parts brought into play and the transmission of power in the six different speed positions (four forward and two reversed).

In the desirable form of construction shown in the accompanying drawings, A is a lower half of the gear-case, to which the upper half (not shown) is bolted, holding thereby the bearings, shifting rods, etc., in place. The driving shaft B is mounted in the bearings $B^4$ and $B^5$. The sliding gear $B^1$ is mounted upon a feathered portion of the driving shaft B. It can therefore be shifted along the shaft and turned positively by it. The intermediate shaft $B^8$, which is axially coincident with the driving shaft B, is mounted in the bearings $B^6$ and $B^7$. At its one end is shown keyed thereto the bevel gear $B^3$, while the other end terminates in the spur gear $B^2$. The intermediate shaft $B^8$ is telescoped, loosely receiving the one end of shaft B in the bearing $B^5$. An internal cut gear $B^9$ is machined within the gear $B^2$, so that when the sliding gear $B^1$ is shifted to the extreme right, it engages with the gear $B^9$, thus locking together the intermediate shaft $B^8$ and the driving shaft B.

A counter shaft C, mounted in the bearings $C^4$ and $C^5$ parallel to the driving shaft B, has keyed to its right end the bevel gear $C^3$, while the gears $C^1$ and $C^2$ (as shown in Fig. 1) fastened upon shaft C, mesh with the gears $B^1$ and $B^2$ of the driving and intermediate shafts respectively.

The driven shaft D, supported by bearings $D^6$ and $D^7$, has mounted upon it the two bevel gears $D^1$ and $D^2$ meshing with the bevel gears $C^3$ and $B^3$ respectively. These bevel gears, not being fastened upon shaft D, can rotate independently of it. The positive dog-clutch members $D^3$ and $D^4$ are mounted upon feathered portions of the driven shaft D. To the teeth or projections of these clutch members are corresponding teeth or projections on the inner face of each of the bevel gears $D^1$ and $D^2$, so that by shifting either of the clutch members $D^3$ or $D^4$ to engage with its corresponding bevel gear, the latter is locked to and turns as a unit with the driven shaft D. The end-thrust bearings $D^8$ and $D^9$ take up the thrust of bevel gears $D^1$ and $D^2$ respectively, these bearings delivering the thrust to the gear-case. In Fig. 1, the bevel gears $D^1$ and $D^2$ are supported entirely by the shaft, while Fig. 2 shows a form of construction in which they are not only supported upon the shaft D but also within the bearings $D^{10}$ and $D^{11}$. The driven shaft D is tubular and within the portion $D^5$ is located the differential gear of the motor vehicle. Into each end of shaft D extend the sprocket shafts or driving axles (not shown). The clutch members $D^3$ and $D^4$ are both actuated by yokes (not shown) fitting into the circumferential grooves $D^{12}$ and $D^{13}$ of the clutch members and these yokes are fastened preferably to a shifting rod (not shown) parallel to D. The yokes are spaced on the shifting rod mentioned, so that the clutch members can be placed in neutral position—neither clutch member being in contact with either of the clutch portions of the bevel gears. Shifting the above mentioned shifting rod in one direction, causes one clutch member to engage with its corresponding bevel gear, while the other clutch member is shifted farther away from the other bevel gear, thereby avoiding any such accident as having both clutch members engage both driven bevel gears at the same time.

Fig. 1 shows gears $C^1$ and $C^2$ of the counter shaft in mesh with gears $B^1$ and $B^2$ of the driving and intermediate shafts respectively. If now the clutch member $D^3$ is engaged with the bevel gear $D^1$, the first or lowest speed will be obtained. While $D^3$ is engaged with $D^1$, member $D^4$ will be shifted away from $D^2$, allowing the latter to be free. The power is delivered from the driving shaft B to the counter shaft C through the gears $B^1$ and $C^1$, and from the counter shaft C to the driven shaft D through bevel gears $C^3$ and $D^1$, as seen in Fig. 3. The gear $C^2$ will turn $B^2$, which in turn will cause bevel gear $B^3$ to rotate $D^2$, but these gears will run idle, the power not being delivered through this path.

If we allow gears $B^1$ and $C^1$ to remain in mesh as before, disengage $D^3$ from $D^1$ and engage $D^4$ with $D^2$, the second speed is obtained. The power is now delivered from the driving shaft B to the counter shaft C through gears $B^1$ and $C^1$, after which it is transmitted to the intermediate shaft $B^8$ through gears $C^2$ and $B^2$, and then from bevel gear $B^3$ to $D^2$ on the driven shaft D, as shown in Fig. 4. The bevel gears $C^3$ and $D^1$ will run idle. If now the clutch members are brought into neutral position, and the gear $B^1$ is meshed with the internal cut gear $B^9$, the third speed is obtained when clutch member $D^3$ engages with bevel gear $D^1$. The power is now delivered to the counter shaft from the driving shaft through gears $B^1$ and $B^9$ and then through gears $B^2$ and $C^2$; from the counter shaft to the driven shaft through bevel gears $C^3$ and $D^1$, as seen in Fig. 5. The bevel gear $B^3$ will drive $D^2$, but they will run idle.

Leaving the driving and intermediate shafts locked together—gear $B^1$ engaged with internal cut gear $B^9$—and shifting the clutch members so that bevel gear $D^2$ is clutched to shaft D, fourth or highest speed is obtained. The power is now delivered direct from the driving shaft to the driven shaft through bevel gears $B^3$ and $D^2$. Gear $B^2$ will turn $C^2$, causing counter shaft C to rotate and bevel gear $C^3$ will rotate $D^1$, but as none of these gears take part in the transmission of the power, they will run idle. In the modification shown in Fig. 2, the gear $C^2$ is shiftable upon the shaft C, so that it can be engaged with $B^2$ as shown, or else disengaged from the same gear when so desired. A shifting rod G and a yoke $G^1$ is provided for this purpose. We have seen that on fourth speed, we obtain a direct drive and as it is desirable to eliminate all possible friction at this speed, I have provided for this by allowing gear $C^2$, which takes no part in the deliverance of power on fourth speed, to be slid out of mesh with gear $B^2$. The clutch member $D^3$ is not engaged with bevel gear $D^1$ on fourth speed, thus leaving it independent of the driven shaft D. The driving and intermediate shafts will be locked, turning as a unit, and will drive the shaft D through bevel gears $B^3$ and $D^2$, while the entire counter shaft and bevel gear $D^1$ will be at rest, as shown in Fig. 6. On first speed gear $C^2$ takes no part in the operation and if so desired can be shifted out of engagement with $B^2$, thus allowing the entire intermediate shaft $B^8$ and the bevel gear $D^2$ to remain at rest. Similarly on the slow reverse speed, as will be seen later.

When the gear $B^1$ is shifted from the position shown in Fig. 1 to engage with the internal gear $B^9$, the clutch members are in a neutral position, so that with the master-clutch of the motor vehicle thrown out, the whole gearing system is relieved of all strains, and the engagement of the gears can produce no injury to them. When the above mentioned engagement takes place, the various shafts, gears, etc., are turning only by their own momentum. Similarly when gear $B^1$ is disengaged from $B^9$ and is meshed with gear $C^1$. When the gear $C^2$ is shifted out of engagement with $B^2$, it is shifted while the clutch members are in a neutral position, so that it is also relieved of all strain. Thus whenever either of the two sliding gears are shifted, the clutch members are already in their neutral position.

In order to obtain a reverse speed, a pinion $E^1$, mounted upon the shaft E located above or below the plane of shafts B, C and D, is introduced into the train of gears, as shown in Figs. 2, 7 and 8. The drive is now from gear $B^1$ to the reversing pinion $E^1$, and from the latter to gear $C^1$ on the counter-shaft. For a slow reverse speed, the power is then delivered from the counter shaft to the driven shaft D through bevel gears $C^3$ and $D^1$, as in Fig. 7. Should a higher reverse speed be desired, the counter shaft will then drive the intermediate shaft, which in turn drives the driven shaft as indicated in Fig. 8.

The gear $B^1$ is shifted by means of the shifting rod F and the yoke $F^1$. Upon this rod is fastened the cam-plate $F^2$ as shown. A lever $F^4$, pivoted at $F^5$, has at its one end the roller $F^3$ in contact with the cam-plate $F^2$, while its other end terminates in the form of a fork located within a slit (not shown) cut horizontally through the middle of shaft E. Perpendicular to this slit and extending through the shaft E, is located a pin $E^2$, clearly seen in Fig. 2. The two prongs of the forked end of lever $F^4$ engage with this pin, so that should the lever $F^4$ be swung into any position within its limits, the shaft E will be correspondingly shifted. The gear $E^1$ is loose rotatably upon shaft E and when brought into action the former revolves upon the latter. Referring to Fig. 1, it will be seen that if the shifting rod F, and in turn the gear $B^1$, is shifted to the right, the lever $F^4$ will remain in the same position shown. All this time the idle reversing gear $E^1$ is disengaged from all gears, entirely free and at rest. Assuming the parts to be in the position shown in Fig. 1, we will shift the rod F to the left. Gear $B^1$ disengages from $C^1$ and engages with $E^1$, which until now maintains the same position. As soon as gear $B^1$ has entirely disengaged from $C^1$, the projecting portion of the cam-plate $F^2$ strikes the roller of lever $F^4$, thereby causing the shaft E, and in turn the gear $E^1$, to be shifted to the right, the gear $B^1$ continuing in the mean-time its travel to the left. Due to the extra long length of gear $E^1$, it still remains in mesh with $B^1$ while it is completely engaged with $C^1$ at its other end. In shifting rod F to the right, the reverse operation takes place. The gear $E^1$ is quickly slid out of engagement with $C^1$ till it reaches its idle position. Then the gear $B^1$, which in the meantime has started to move to the right, still in mesh with $E^1$, engages with $C^1$. When fully disengaged, the reversing gear is entirely free and at rest. The projecting portion of the plate $F^2$ is so located that the gear $E^1$ is shifted only after the gear $B^1$ has entirely cleared the gear $C^1$, when shifting to the left. A similar projection, formed by cutting a recess in $F^2$ and into which the roller projects during the operation, carries the latter in its direction when rod F is shifted again to the right. The entire mechanism is positive in its action, not relying upon springs for its operation.

All gears run in a bath of oil, the lower half of the gear-case acting as a reservoir for such.

As many motor vehicles, employing a four speed change gear, have the direct drive on third speed and the driven shaft rotating at a still higher velocity on fourth speed, I can, by a suitable rearrangement of the relative sizes of the different gears, obtain this result. With this object in view and the sizes of the gears predetermined, the transmission of power for first speed would be as indicated in Fig. 4; for second speed as shown in Fig. 3; for third speed as shown in Fig. 6; and for fourth speed as shown in Fig. 5.

Having thus described my invention with reference to a desirable form thereof, but without restricting myself to the construction shown because parts may be added, omitted, modified, and substituted without altering the principle embodied in the invention, what I claim as new is:

1. A change speed gearing comprising a driven shaft, a pair of separate bevel gears in axial alinement with and rotatably independent of said driven shaft, and each provided with a clutch portion, clutch members shiftable longitudinally on said driven shaft, a counter shaft, an intermediate shaft parallel thereto, a bevel gear secured to each of the counter and intermediate shafts and adapted to mesh with the said pair of separate bevel gears, a driving shaft in axial alinement with said intermediate shaft, and power transmitting means between said counter intermediate and driving shafts, substantially for the purposes set forth.

2. A change speed gearing comprising a driven shaft, a pair of separate bevel gears in axial alinement with and rotatably independent of said driven shaft, means for clutching either of said bevel gears to the driven shaft, a counter shaft, an intermediate shaft parallel thereto, a bevel gear secured to each of the counter and intermediate shafts and adapted to mesh with the said pair of separate bevel gears, a driving shaft in axial alinement with said intermediate shaft, and power transmitting means between said counter intermediate and driving shafts, substantially for the purposes set forth.

3. A change speed gearing comprising a driven shaft, a pair of separate bevel gears in axial alinement with and rotatably independent of said driven shaft, means for clutching either of said bevel gears to the driven shaft, a counter shaft, an intermediate shaft parallel thereto, a bevel gear secured to each of the counter and intermediate shafts and adapted to mesh with the said pair of separate bevel gears, a driving shaft in axial alinement with said intermediate shaft, a pair of gears on the counter shaft, and a pair of corresponding gears on the driving and intermediate shafts, substantially for the purposes set forth.

4. A change speed gearing comprising a driven shaft, a pair of separate bevel gears in axial alinement with and rotatably independent of said driven shaft, means for clutching either of said bevel gears to the driven shaft, a counter shaft, an intermediate shaft parallel thereto, a bevel gear secured to each of the counter and intermediate shafts and adapted to mesh with the said pair of separate bevel gears, a driving shaft in axial alinement with said intermediate shaft, a pair of gears on the countershaft, and a pair of corresponding gears on and capable of locking the driving and intermediate shafts, substantially for the purposes set forth.

5. A change speed gearing comprising a driven shaft, a pair of separate bevel gears in axial alinement with and rotatably independent of said driven shaft, means for clutching either of said bevel gears to the driven shaft, a counter shaft, an intermediate shaft parallel thereto, a bevel gear secured to each of the counter and intermediate shafts and adapted to mesh with the said pair of separate bevel gears, a driving shaft in axial alinement with said intermediate shaft, a gear secured to the counter shaft, a shiftable gear on the driving shaft adapted to be slid into or out of engagement with said gear on the counter shaft, a gear secured to the intermediate shaft, and a corresponding gear on the counter shaft, substantially for the purposes set forth.

6. A change speed gearing comprising a driven shaft, a pair of separate bevel gears in axial alinement with and rotatably independent of said driven shaft, means for clutching either of said bevel gears to the driven shaft, a counter shaft, an intermediate shaft parallel thereto, a bevel gear secured to each of the counter and intermediate shafts and adapted to mesh with the said pair of separate bevel gears, a driving shaft in axial alinement with said intermediate shaft, a gear secured to the counter shaft, a shiftable gear on the driving shaft adapted to be slid into or out of engagement with said gear on the counter shaft, a gear secured to the intermediate shaft, and a shiftable gear on the counter shaft adapted to be slid into or out of engagement with said gear on the intermediate shaft, substantially for the purposes set forth.

7. A change speed gearing comprising a driven shaft, a pair of separate bevel gears in axial alinement with and rotatably independent of said driven shaft, and each provided with a clutch portion, clutch members shiftable longitudinally on said driven shaft adapted to engage with either of the clutch portions of said bevel gears, a counter shaft, an intermediate shaft parallel thereto, a bevel gear secured to each of the counter and intermediate shafts and adapted to mesh with the said pair of separate bevel gears, a driving shaft in axial alinement with said intermediate shaft, a gear secured to the counter shaft, a shiftable gear on the driving shaft, a gear secured to the intermediate shaft having internal clutch teeth adapted to take over said gear on the driving shaft, and a corresponding gear on the counter shaft, substantially for the purposes set forth.

8. A change speed gearing comprising a driven shaft, a pair of separate bevel gears in axial alinement with and rotatably independent of said driven shaft, means for clutching either of said bevel gears to the driven shaft, a counter shaft, an intermediate shaft parallel thereto, a bevel gear secured to each of the counter and intermediate shafts and adapted to mesh with the said pair of separate bevel gears, a driving shaft in axial alinement with said intermediate shaft, a gear secured to the counter shaft, a shiftable gear on the driving shaft adapted to be slid into or out of engagement with said gear on the countershaft, a gear secured to the intermediate shaft, a corresponding gear on the counter shaft, and means in combination with certain of said gears for obtaining a reverse drive, substantially for the purposes set forth.

9. A change speed gearing comprising a driven shaft, a pair of separate bevel gears in axial alinement with and rotatably independent of said driven shaft, means for clutching either of said bevel gears to the driven shaft, a counter shaft, an intermediate shaft parallel thereto, a bevel gear secured to each of the counter and intermediate shafts and adapted to mesh with the said pair of separate bevel gears, a driving shaft in axial alinement with said intermediate shaft, a gear secured to the counter shaft, a shiftable gear on the driving shaft adapted to be slid into or out of engagement with said gear on the counter shaft, a gear secured to the intermediate shaft, a corresponding gear on the counter shaft, an idle reversing gear, and means for shifting said reversing gear so as to engage it with the gear on the driving shaft and the first-mentioned gear on the counter shaft, substantially for the purposes set forth.

10. A change speed gearing comprising a driven shaft, a counter shaft, an intermediate shaft parallel thereto, a driving shaft in axial alinement with said intermediate shaft, a gear secured to the counter shaft, a shiftable gear on the driving shaft adapted to transmit power to said gear on the counter shaft, a gear secured to the intermediate shaft having internal clutch teeth adapted to take over said gear on the driving shaft, a corresponding gear on the counter shaft adapted to transmit to or receive power from said gear on the intermediate shaft, and power transmitting means between said driven and counter shafts and said driven and intermediate shafts, substantially for the purposes set forth.

11. A change speed gearing comprising a driven shaft, a counter shaft, an intermediate shaft, power transmitting means between said driven and counter and said driven and intermediate shafts, a driving shaft, and power transmitting means between said counter intermediate and driving shafts, substantially for the purposes set forth.

12. A change speed gearing comprising a driven shaft, a counter shaft at an angle thereto, an intermediate shaft at an angle to said driven shaft, power transmitting means between said driven and counter and said driven and intermediate shafts, a driving shaft, and power transmitting means between said counter intermediate and driving shafts, substantially for the purposes set forth.

13. A change speed gearing comprising a driven shaft, a counter shaft perpendicular thereto, an intermediate shaft perpendicular to said driven shaft, power transmitting means between said driven and counter and said driven and intermediate shafts, a driving shaft, and power transmitting means between said counter intermediate and driving shafts, substantially for the purposes set forth.

14. A change speed gearing comprising a driven shaft, a counter shaft perpendicular thereto, an intermediate shaft perpendicular to said driven shaft, power transmitting means between said driven and counter and said driven and intermediate shafts, a driving shaft perpendicular to said driven shaft, and power transmitting means between said counter intermediate and driving shafts, substantially for the purposes set forth.

15. A change speed gearing comprising a driven shaft, a counter shaft perpendicular thereto, an intermediate shaft perpendicular to said driven shaft, power transmitting means between said driven and counter and said driven and intermediate shafts, a driving shaft in axial alinement with said intermediate shaft, and power transmitting means between said counter intermediate and driving shafts, substantially for the purposes set forth.

16. A change speed gearing comprising a driven shaft, a counter shaft, an intermediate shaft, power transmitting means between said driven and counter and said driven and intermediate shafts, a driving shaft, means for transmitting power from the driving shaft to the counter or intermediate shaft, and means for transmitting power from the counter shaft to the intermediate shaft or vice-versa, substantially for the purposes set forth.

17. A change speed gearing comprising a driven shaft, a counter shaft, an intermediate shaft, power transmitting means between said driven and counter and said driven and intermediate shafts, a driving shaft, an axially movable element on said driving shaft adapted to effect more than one power transmitting connection, and power transmitting means between said counter and intermediate shafts, substantially for the purposes set forth.

18. A change speed gearing comprising a driven shaft, a counter shaft, an intermediate shaft, power transmitting means between said driven and counter and said driven and intermediate shafts, a driving shaft, an axially movable element on said driving shaft adapted to transmit power from the driving shaft to the counter or intermediate shaft, and means for transmitting power from the counter shaft to the intermediate shaft or vice-versa, substantially for the purposes set forth.

19. A change speed gearing comprising a driven shaft, a counter shaft, gearing between said driven and counter shafts, an intermediate shaft, gearing between said driven and intermediate shafts, a driving shaft, and power transmitting means between said counter intermediate and driving shafts, substantially for the purposes set forth.

20. A change speed gearing comprising a driven shaft, a counter shaft, gearing between said driven and counter shafts, means for making said gearing operative or inoperative, an intermediate shaft, gearing between said driven and intermediate shafts, means for making said gearing operative or inoperative, a driving shaft, and power transmitting means between said counter intermediate and driving shafts, substantially for the purposes set forth.

21. A change speed gearing comprising a driven shaft, a pair of gears in axial alinement with and rotatably independent of said driven shaft, means for clutching either of said gears to the driven shaft, a counter shaft, an intermediate shaft, a gear secured to each of the counter and intermediate shafts and adapted to mesh with the said pair of gears on the driven shaft, a driving shaft, and power transmitting means between said counter intermediate and driving shafts, substantially for the purposes set forth.

Signed at the city of, county of, and State of New York, this 12th day of November, 1908.

AUSTIN M. WOLF.

Witnesses:
EDWARD P. MURTHA,
FRANK MARKS.